Feb. 12, 1924.
H. F. THOMPSON
HAND OPERATED VEHICLE
Filed Oct. 16, 1922
1,483,321
2 Sheets-Sheet 1
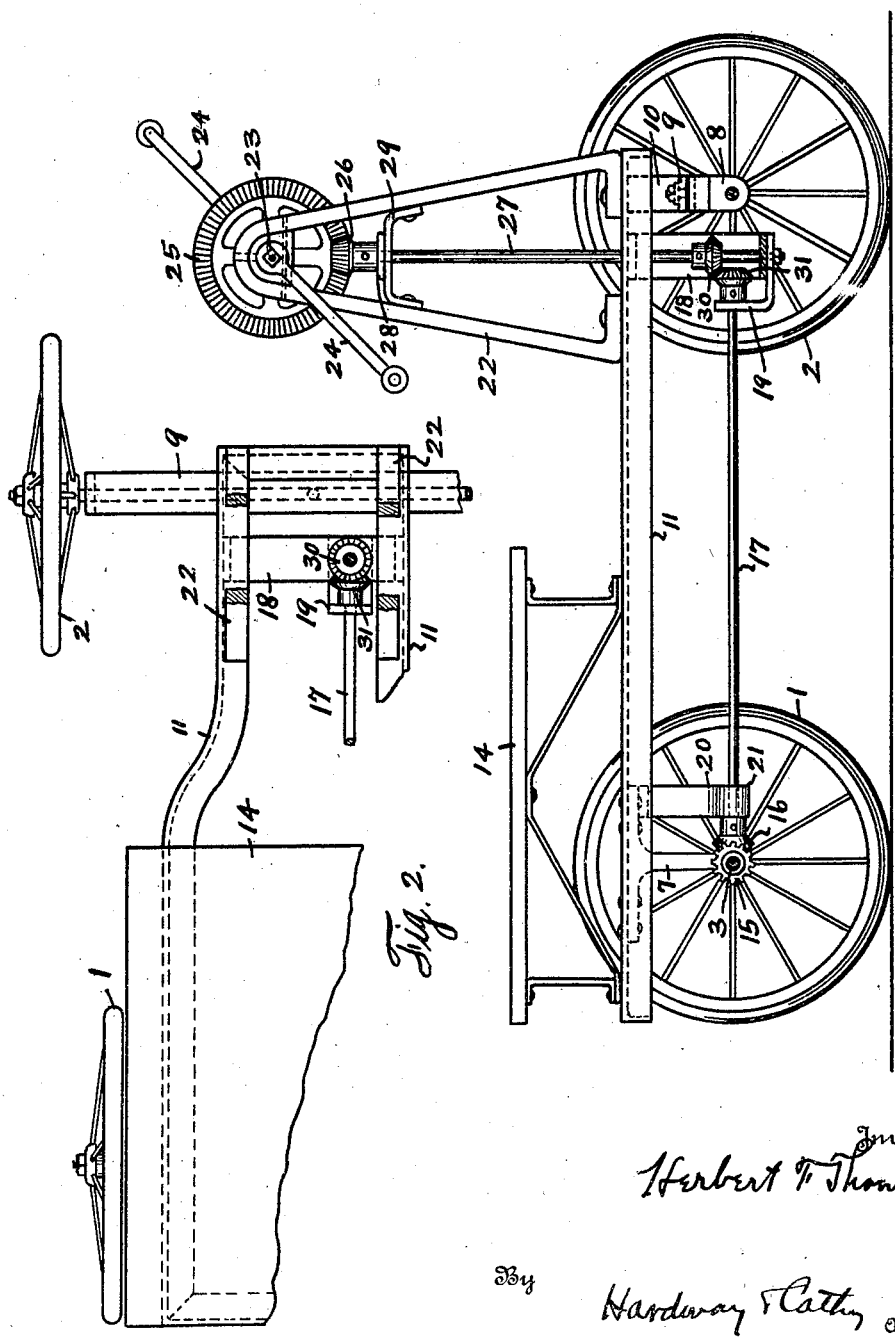

Feb. 12, 1924.
H. F. THOMPSON
HAND OPERATED VEHICLE
Filed Oct. 16, 1922
1,483,321
2 Sheets-Sheet 2
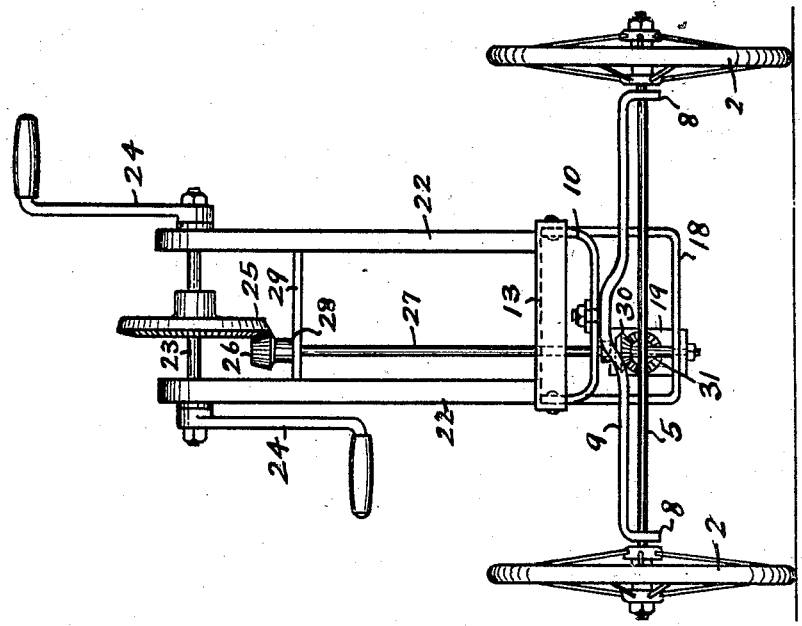
Fig. 3.
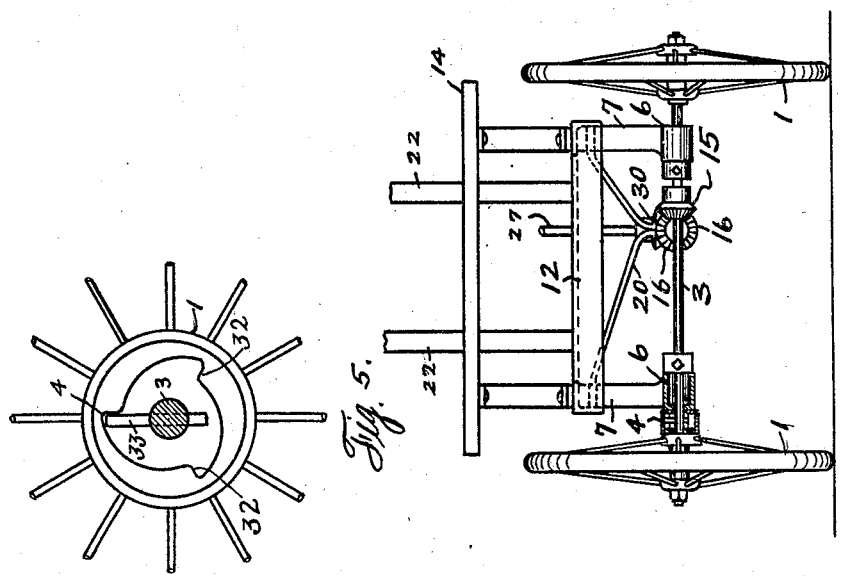
Fig. 5.
Fig. 4.
Inventor
Herbert F Thompson
By Handway Cathey
Attorneys Patented Feb. 12, 1924.

1,483,321

UNITED STATES PATENT OFFICE.

HERBERT F. THOMPSON, OF HOUSTON, TEXAS.

HAND-OPERATED VEHICLE.

Application filed October 16, 1922. Serial No. 594,742.

*To all whom it may concern:*

Be it known that I, HERBERT F. THOMPSON, citizen of the United States, residing at Houston, in the county of Harris and State of Texas, have invented certain new and useful Improvements in Hand-Operated Vehicles, of which the following is a specification.

This invention relates to new and useful improvements in a hand operated vehicle.

One object of the invention is to provide a toy vehicle adapted for use by children and designed to be propelled by hand.

Another object of the invention is to provide a vehicle of the character described which is of simple construction and may be cheaply manufactured and easily propelled.

With the above and other objects in view the invention has particular relation to certain novel features of construction, operation and arrangement of parts, an example of which is given in this specification and illustrated in the accompanying drawings, wherein:—

Figure 1 is a side view of the vehicle shown partly in section.

Figure 2 is a fragmentary plan view partly in section.

Figure 3 is a front elevation.

Figure 4 is a fragmentary rear elevation partly in section and,

Figure 5 is a fragmentary inside view of one of the driving wheels showing the clutch through which the operative connection between said wheel and the rear axle may be effected.

In the drawings, the numerals 1, 1 designate the rear or traction wheels, and the numerals 2, 2 designate the front or steering wheels. One of the traction wheels is rotatably mounted on the rear axle 3 and is capable of being clutched therewith through the well known type of clutch mechanism 4 which operates, when the rear axle 3 is rotated in one direction but runs idly when the axle is rotated in the other direction. This clutch embodies a pawl 33, which is freely slidable in a transverse bearing through the axle 3; and also embodies a plurality of cams 32 within the hub of the adjacent wheel 1. One end of each cam forms an abrupt shoulder against which the pawl engages when the axle is rotated to propel the vehicle forwardly, the inner side of each cam slopes toward the other end so that the pawl will ride over it when the axle is rotated in the other direction. The other traction wheel is fixed to said rear axle. When the rear vehicle axle is moving forwardly the clutch will engage and traction will be imparted through both of the traction wheels, but when the driving mechanism is reversed no traction will be imparted to the traction wheel carrying the clutch and the turning of the vehicle may thus be facilitated.

The numeral 5 designates the front axle to which the steering wheels are fixed. The rear axle runs in bearings 6, 6 carried by the lower ends of the supports 7, 7. These bearings may be of the roller, or other anti-friction type.

The front axle runs in bearings 8, 8 through the downwardly turned ends of the yoke 9, and pivoted on this yoke is a bolster 10. A frame work is provided, formed of the side members 11, 11 which are connected at their rear and front ends respectively by the end members 12 and 13, and this frame work is supported at its rear end by the support 7, and at its front end by the bolster 10. Mounted upon the rear end of the frame work is the usual seat 14. The rear axle has a pinion 15 fixed thereon which is in mesh with a corresponding pinion 16 which is fixed upon the rear end of the propeller shaft 17. Depending from the forward end of the frame work there is a bracket 18 which has a bearing member 19, and depending from the rear end of the frame work there is a bracket 20 formed with the bearing 21. The propeller shaft runs in the bearings 19 and 21.

Fixed to the respective side members 11 and upstanding therefrom are the A frames 22, 22 whose upper ends are formed with aligned bearings in which the crank shaft 23 rotates, and the respective ends of this crank shaft have the cranks 24, 24 fixed thereto through which said crank shaft may be rotated. The crank shaft has a bevel gear 25 fixed thereon between the A frames and which is in mesh with a pinion 26 which is fixed on the upper end of the drive shaft 27. The upper end of this shaft works in a bearing 28 which is carried by the cross bar 29 supported by said A frames, and the lower end of said shaft works in a suitable bearing in the bracket 18 and carries a fixed pinion 30 which is in mesh with a corresponding pinion 31 fixed on the front end of the propeller shaft.

The driver seated on the seat 14 may readily grasp and turn the cranks 24 and thereby propel the vehicle and the vehicle may be steered by the feet of the driver resting on the respective ends of the yoke 9.

What I claim is:

1. A vehicle including a front and a rear axle, carrier wheels supporting said axles, a yoke having downwardly turned ends formed with bearings in which the front axle runs, supports formed with bearings in which the rear axle runs, a frame to which said supports are rigidly secured, a bolster fastened to the front end of said frame and pivoted to said yoke, a propeller shaft geared to the rear axle, spaced A frames upstanding from the frame at the front end thereof, a crank shaft rotatably mounted in suitable bearings in said A frames, hand operated cranks fixed to the ends of said crank shaft, a drive shaft in operative connection with said crank shaft and said propeller shaft through which the propeller shaft may be driven from the crank shaft.

2. A vehicle including a front and a rear axle, carrier wheels supporting said axles, supports formed with bearings in which the rear axle runs, a frame to which said supports are rigidly secured, a yoke having downwardly turned ends formed with bearings in which the front axle runs, a bolster fastened to the front end of said frame and pivoted to said yoke, a propeller shaft geared to the rear axle, spaced A frames upstanding from the frame at the front end thereof, a crank shaft rotatably mounted in suitable bearings in said A frames, hand operated cranks fixed to the ends of said crank shaft, a drive shaft in operative connection with said crank shaft and said propeller shaft through which the propeller shaft may be driven from the crank shaft, one of said rear wheels being connected to the rear axle by a one way clutch and the other of said wheels being rigid with said axle.

In testimony whereof I have signed my name to this specification in the presence of two subscribing witnesses.

HERBERT F. THOMPSON.

Witnesses:
E. V. HARDWAY,
W. H. DUNLAY.